(12) United States Patent
Moon et al.

(10) Patent No.: US 6,930,253 B2
(45) Date of Patent: Aug. 16, 2005

(54) COMPACT OPTICAL CABLE

(75) Inventors: Seung-Hyun Moon, Kumi-shi (KR); Kyung-Tae Park, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/374,870

(22) Filed: Feb. 26, 2003

(65) Prior Publication Data

US 2003/0165310 A1 Sep. 4, 2003

(30) Foreign Application Priority Data

Mar. 4, 2002 (KR) ........................................ 2002-11282

(51) Int. Cl.$^7$ ................................................ H01B 7/00
(52) U.S. Cl. ................................ 174/120 R; 385/103
(58) Field of Search ..................... 174/113 R, 120 R, 174/120 C, 121 R, 122 R; 385/103, 109, 113

(56) References Cited

U.S. PATENT DOCUMENTS

| | | | |
|---|---|---|---|
| 4,078,853 A | | 3/1978 | Kempf et al. ............ 350/96.23 |
| 4,645,298 A | * | 2/1987 | Gartside, III ................ 385/106 |
| 4,743,085 A | * | 5/1988 | Jenkins et al. ............... 385/113 |
| 4,770,489 A | | 9/1988 | Saito et al. ............... 350/96.23 |
| RE33,459 E | * | 11/1990 | Bohannon et al. ........... 385/107 |
| 5,042,903 A | * | 8/1991 | Jakubowski ................. 385/101 |
| 5,109,457 A | | 4/1992 | Panuska et al. ............. 385/102 |
| 5,201,020 A | * | 4/1993 | Kannabiran .................. 385/113 |
| 5,295,215 A | | 3/1994 | Fedoroff et al. ............. 385/109 |
| 5,305,411 A | * | 4/1994 | Arroyo ......................... 385/109 |
| 5,852,698 A | * | 12/1998 | Bringuier ..................... 385/113 |
| 6,055,351 A | | 4/2000 | Yang et al. .................. 385/113 |
| 6,101,305 A | | 8/2000 | Wagman et al. ............. 385/113 |

FOREIGN PATENT DOCUMENTS

| | | | |
|---|---|---|---|
| CN | 2181011 Y | 10/1994 | ............ G02B/6/44 |
| CN | 1150482 A | 5/1997 | ............ G02B/6/44 |
| CN | 2331978 Y | 4/1999 | ............ G02B/6/44 |
| CN | 2396405 Y | 9/2000 | ............ G02B/6/44 |
| CN | 1289056 A | 3/2001 | ............ G02B/6/44 |
| DE | 9203161 | 4/1992 | ............ G02B/6/44 |
| EP | 0676654 A2 | 3/1995 | ............ G02B/6/44 |
| EP | 1076253 A2 | 2/2001 | ............ G02B/6/44 |

* cited by examiner

*Primary Examiner*—Chau N. Nguyen
(74) *Attorney, Agent, or Firm*—Cha & Reiter, L.L.C.

(57) ABSTRACT

A compact optical cable comprises a tube having the shape of a hollow cylinder and including multiple cores of optical fibers mounted therein; a sheath formed by an extrusion process to surround the tube at a certain thickness; a plurality of strength members arranged inside the sheath; and, a plurality of pads arranged inside the sheath to ensure that each pad intervenes between the tube and the strength members.

4 Claims, 3 Drawing Sheets

COMPACT OPTICAL CABLE

CLAIM OF PRIORITY

This application claims priority to an application entitled "SMALL, LIGHTWEIGHT OPTICAL CABLE", filed in the Korean Industrial Property Office on Mar. 4, 2002 and assigned Serial No. 2002-11282, the contents of which are hereby incorporated by reference.

BACKGROUND OF THE INVENTION

1. Field of the Invention

The present invention relates to an optical cable, and more particularly to a high-density optical cable.

2. Description of the Related Art

Currently, the demands for compact, light weight, and high-density optical cables are growing as there is a shortage of installation spaces for the new cables due to the already occupied optical cables. To address this, an attempt to reduce the outer diameter of the optical cables has been made to make possible installation of such cables in the existing narrow ducts.

FIG. 1 is a sectional view illustrating a conventional compact optical cable. The compact optical cable comprises multiple cores of optical fibers 110, a tube 120 surrounding the optical core members, two pairs of core strength members 140, and a sheath 130. The tube 120 has the shape of a hollow cylinder and includes the multiple cores of optical fibers 110 mounted therein. The tube 120 has a thickness of about 1 mm. The sheath 130 with a predetermined thickness is formed by an extrusion process and surrounds the tube 120. The sheath constitutes the outermost layer of the compact optical cable to protect its interior components against the external environment.

The two pairs of the core strength members 140 complement the mechanical weakness of the optical cables to a certain extent. However, if the external stress is severe, the strength members tend to deteriorate the mechanical properties of the optical cables.

FIGS. 2 and 3 are illustrates the shape of the compact optical cables shown in FIG. 1 when an excessive stress is applied. As shown in FIG. 2, the external stress 150 is applied to the outer sheath layer of the cable, then, as shown in FIG. 3, the optical cable gets severely deformed by the stress applied thereto. The strength members 140, which have been originally arranged inside the sheath 130, penetrate into inside the sheath and press the tube 120 when subject to stress. Note that the tube 120 has a thickness of about 1 mm, but the strength members 140 have a higher degree of hardness than those of the tube 120 or sheath 130. As result, the optical fibers 110 mounted inside the tube 120 are subject to severe stress due to the movement of the strength members 140.

As described above, the conventional compact optical cable is provided with a plurality of strength members to increase the mechanical strength of the cable. However, the strength members tend to have opposite effect if excessive external stress is applied to the cable.

SUMMARY OF THE INVENTION

The present invention overcomes the above-described problems, and provides additional advantages, by providing a small, lightweight optical cable, fabricated to prevent the strength members from penetrating into the inside a sheath, thereby making it possible to minimize the deterioration of its mechanical properties upon application of excessive external stress.

According to one aspect of the invention, the inventive lightweight optical cable includes: a tube having a shape of a hollow cylinder including multiple cores of optical fibers mounted therein; a first sheath formed by an extrusion process to surround the tube at a predetermined thickness; a second sheath formed by an extrusion process to surround the first sheath at a predetermined thickness; and, a plurality of strength members arranged inside the second sheath.

According to another aspect of the present invention, the small, lightweight optical cable includes a tube having a shape of a hollow cylinder and including multiple cores of optical fibers mounted therein; a sheath formed by an extrusion process to surround the tube at a predetermined thickness; a plurality of strength members arranged inside the sheath; and, a plurality of pads intervening between the tube and the strength members, each pad being separately formed.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. For the purposes of clarity and simplicity, a detailed description of known functions and configurations incorporated herein will be omitted as it may make the subject matter of the present invention rather unclear.

Figure 1:
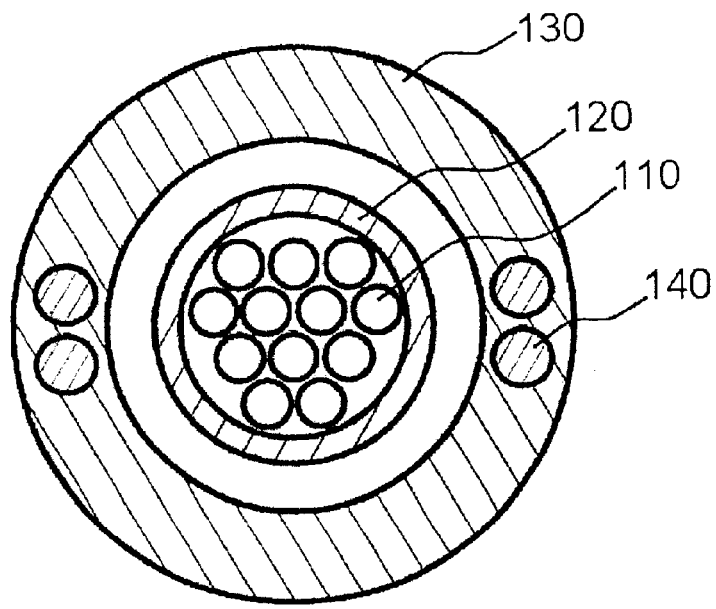
FIG. 1 is a sectional view illustrating the configuration of a conventional small, lightweight optical cable.
Figure 2:
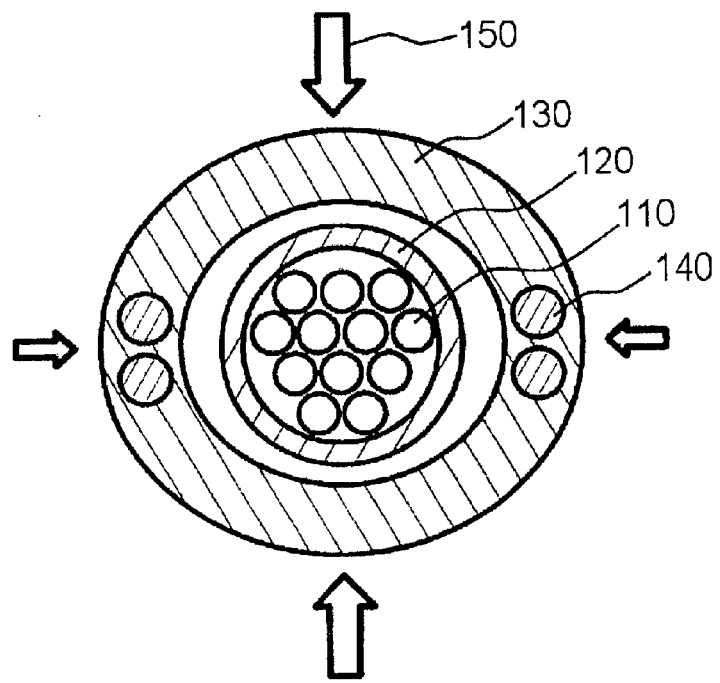
FIGS. 2 and 3 are views for showing the small, lightweight optical cable, illustrated in FIG. 1, upon an application of excessive stress.
Figure 3:
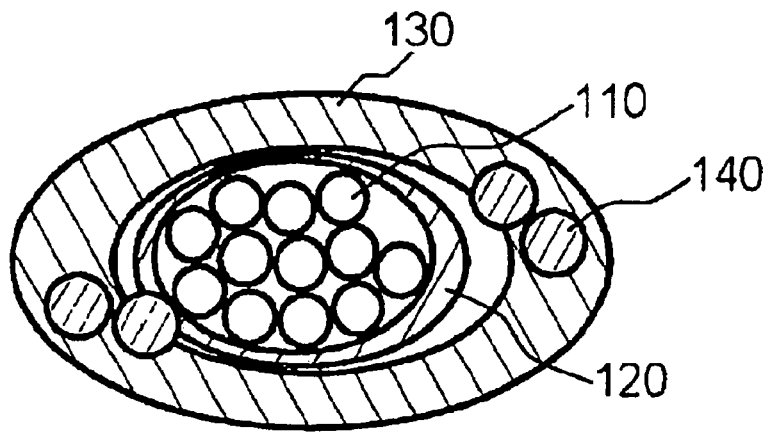
Figure 4:
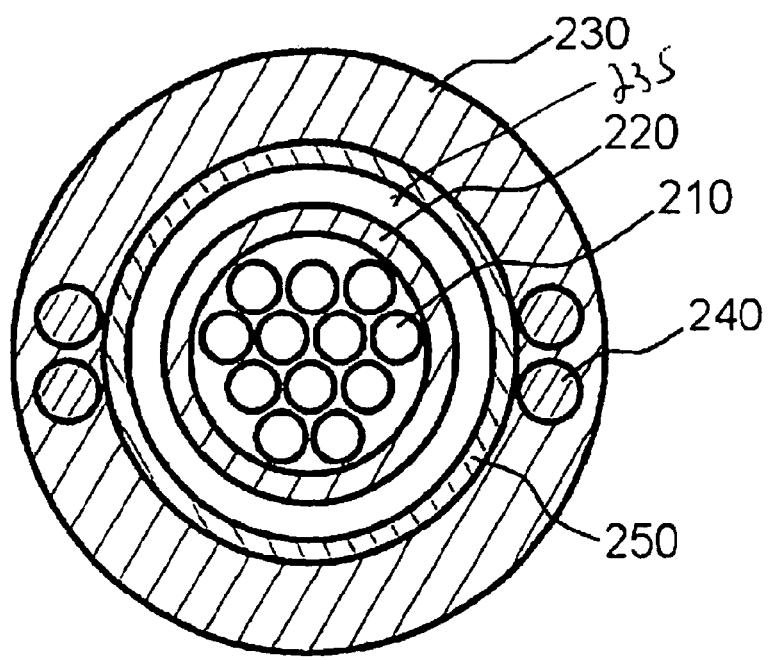
FIG. 4 is a view illustrating the configuration of a small, lightweight optical cable in accordance with a preferred embodiment of the present invention; and, FIG. 5 is a view illustrating the configuration of a small, lightweight optical cable in accordance with an alternative embodiment of the present invention.

FIG. 4 shows the configuration of a small, lightweight optical cable in accordance with a preferred embodiment of the present invention. The inventive optical cable includes a plurality of cores 210, a tube 220 surrounding the cores, a first sheath 250, a second sheath 230 and two pairs of core strength members 240 at both sides. The tube 220 has a shape of a hollow cylinder and has a thickness of 1 mm and below. The first sheath 250 with a predetermined thickness is formed by an extrusion process and surrounds the tube 220, leaving a circumferential gap 235, between the exterior surface of the tube 220 and the interior surface of the first sheath 250. The first sheath 250 performs the function of blocking the penetration by the strength members 240 into the second sheath 230 when an external stress applied thereto. As a material for the first sheath 250, a high-density polyethylene (HDPE) maybe used.

The second sheath 230 with a predetermined thickness is formed by an extrusion process to surround the first sheath 250. The second sheath 230 constitutes the outermost layer of the inventive optical cable and protects its interior components from external environments. As a material for the second sheath 230, a polyvinyl chloride (PVC) or polyethylene (PE) may be used.

The two pairs of the core strength members 240 are arranged inside the second sheath 230, and each pair is arranged symmetrically around the tube 220. Each of the strength members 240 has a long thread shape like the optical fibers 210. The strength members 240 perform the function of enhancing the mechanical properties of the inventive optical cable. As a material for the strength members 240, a fiberglass reinforced plastic (FRP) may be used. For forming the first and second sheaths 250 and 230, a dual extrusion process may be used.

Figure 5:
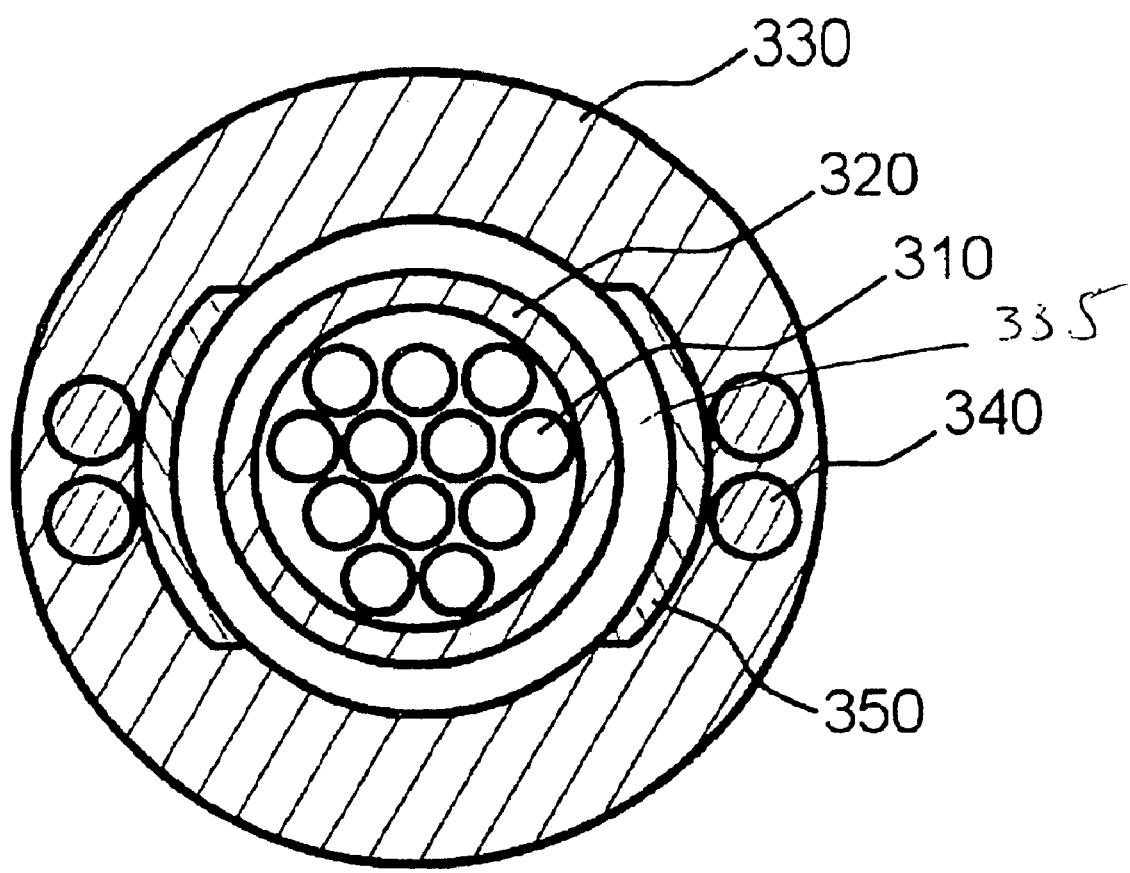

FIG. 5 shows the configuration of a small, lightweight optical cable in accordance with another preferred embodiment of the present invention. The inventive optical cable includes a tube 320 surrounding a plurality of optical cores 310, two pads 350, a sheath 330, and two pairs of the core strength members 340. The tube 320 has the shape of a hollow cylinder and has a thickness of 1 mm and below. It can be seen from the Figure that there is a circumferential gap 335 arranged between the outer surface of the tube 320 and the inner surface of the sheath 330.

The two pads 350 are arranged symmetrically within a solid area of the sheath 330 and occupy a portion of the sheath 330 between the tube 320 and the pairs of the strength members 340. The pads 350 perform the function of blocking penetration of the strength members 340 into the sheath 330 when an external stress is applied. As shown in FIG. 5 the pads 350 intervene between the rube and the strength members without affecting the area of the circumferential gap. As a material for the pads 350, a fiberglass reinforced plastic (FRP) may be used.

The sheath 330 with a certain thickness is formed by an extrusion process and surrounds the two pads 350 and the tube 320. The sheath 330 constitutes the outermost layer of the inventive optical cable and protects its interior components against external environments. As a material for the sheath 330, a polyvinyl chloride (PVC) or polyethylene (PE) may be used.

Two pairs of the strength members 340 are arranged inside the sheath 330, each pair of the strength members being arranged symmetrically around the tube 320. Each of the strength members 340 has a long thread shape similar to the optical fibers 310. The strength members 340 serve to enhance the mechanical properties of the inventive optical cable. As a material for the strength members 340, a fiberglass reinforced plastic (FRP) may be used. For forming the sheath 330, a dual extrusion process may be used.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A compact optical cable, comprising:
   a tube having a plurality of optical fiber core members mounted therein;
   a sheath having a predetermined thickness surrounding the tube so as to leave a circumferential gap between an exterior surface of the tube and in interior surface of the sheath;
   a plurality of strength members disposed inside the sheath; and,
   a plurality of pads arranged within a solid area of the sheath and occupying a portion of the area of the sheath so as to intervene between the tube and the strength members, wherein said circumferential gap remains without any of the plurality of pads therein.

2. The optical cable as set forth in claim 1, wherein the sheath is formed by a dual extrusion or successive extrusion process.

3. The optical cable as set forth in claim 1, wherein the pads comprise a fiberglass reinforced plastic (FRP).

4. The optical cable as set forth in claim 1, wherein the strength members comprise a fiberglass reinforced plastic (FRP).

* * * * *